May 12, 1953 E. M. THORNLEY Re. 23,655

BALLAST REMOVING APPARATUS

Original Filed May 2, 1944 2 Sheets-Sheet 1

INVENTOR:
Edwin M. Thornley
BY
Mann, Brown & Cof
ATTORNEYS

May 12, 1953 E. M. THORNLEY Re. 23,655

BALLAST REMOVING APPARATUS

Original Filed May 2, 1944 2 Sheets-Sheet 2

INVENTOR.
Edwin M. Thornley
BY
Mann, Brown & Cox
ATTORNEYS

Reissued May 12, 1953

Re. 23,655

UNITED STATES PATENT OFFICE 23,655

BALLAST REMOVING APPARATUS

Edwin M. Thornley, Joliet, Ill.

Original No. 2,463,499, dated March 1, 1949, Serial No. 533,806, May 2, 1944. Application for reissue February 27, 1951, Serial No. 213,030

19 Claims. (Cl. 37—104)

Matter enclosed in heavy brackets [ ] appears in the original patent but forms no part of this reissue specification; matter printed in italics indicates the additions made by reissue.

In replacing rail in railroad track, it is often desirable to use the same ties and an adzing machine is commonly used for stripping from the old tie any irregularities left by the old rail and providing a flat surface for the tie plate which is now usually placed between the rail and the tie whether or not one had previously been used. Heretofore it has been the practice to remove the ballast manually from the vicinity in which the adzing blades will be operating. It is a very slow and tedious job to remove the ballast in this way. If it is not removed adequately, the adzing blades may strike a stone and not only cause injury of the blade but perhaps also throw the stone at high speed and possibly injure a workman or bystander.

According to the present invention, the slow and tedious manual removal of ballast and the danger of removing it inadequately are avoided by the provision of a ballast removing machine. The machine is simple in both construction and operation. It runs and is nearly balanced on one rail and includes a motor driving a digging wheel which is spaced the right distance from the rail on which the machine is movable so that when the machine is rocked on the rail to press the wheel down against the ballast, the ballast will be removed at the right position for the adzing of the tie to receive the other rail. The digging wheel removes the ballast so quickly and easily that there is no tendency for an operator to stop the operation too soon with danger of inadequate ballast removal. The digging wheel is designed to fit close beside the ties and is of a sufficient diameter to clean the ballast from along a sufficient length of the tie for safety without being moved longitudinally of the tie and without being pressed unreasonably deeply into the ballast.

Figure 1:
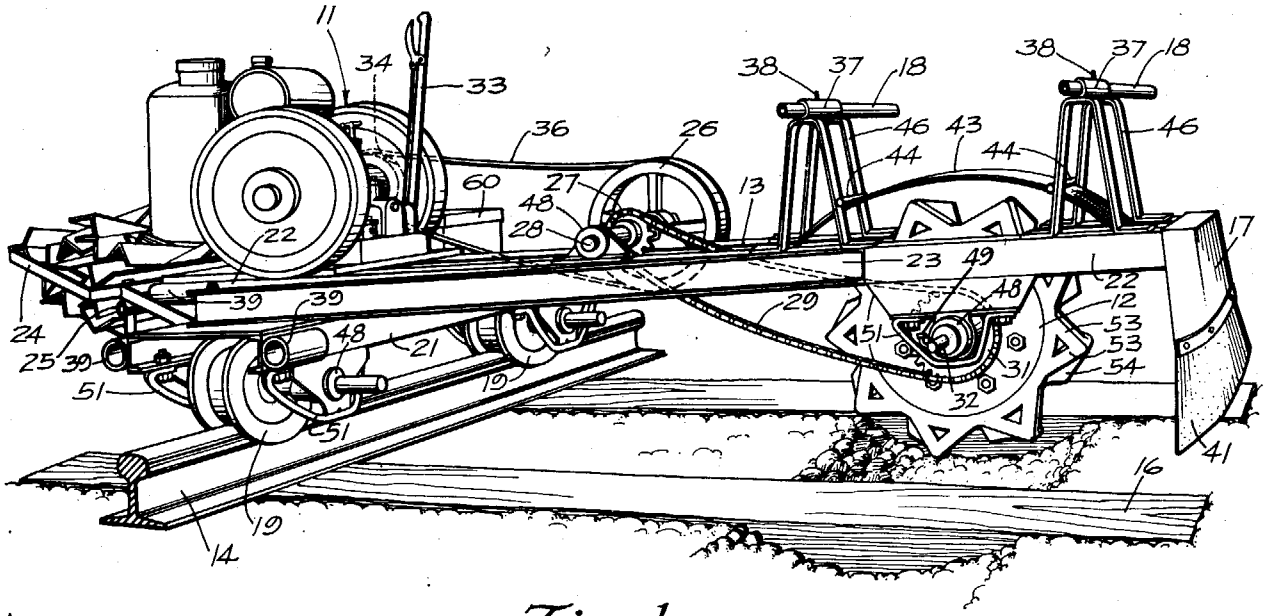
Figure 2:
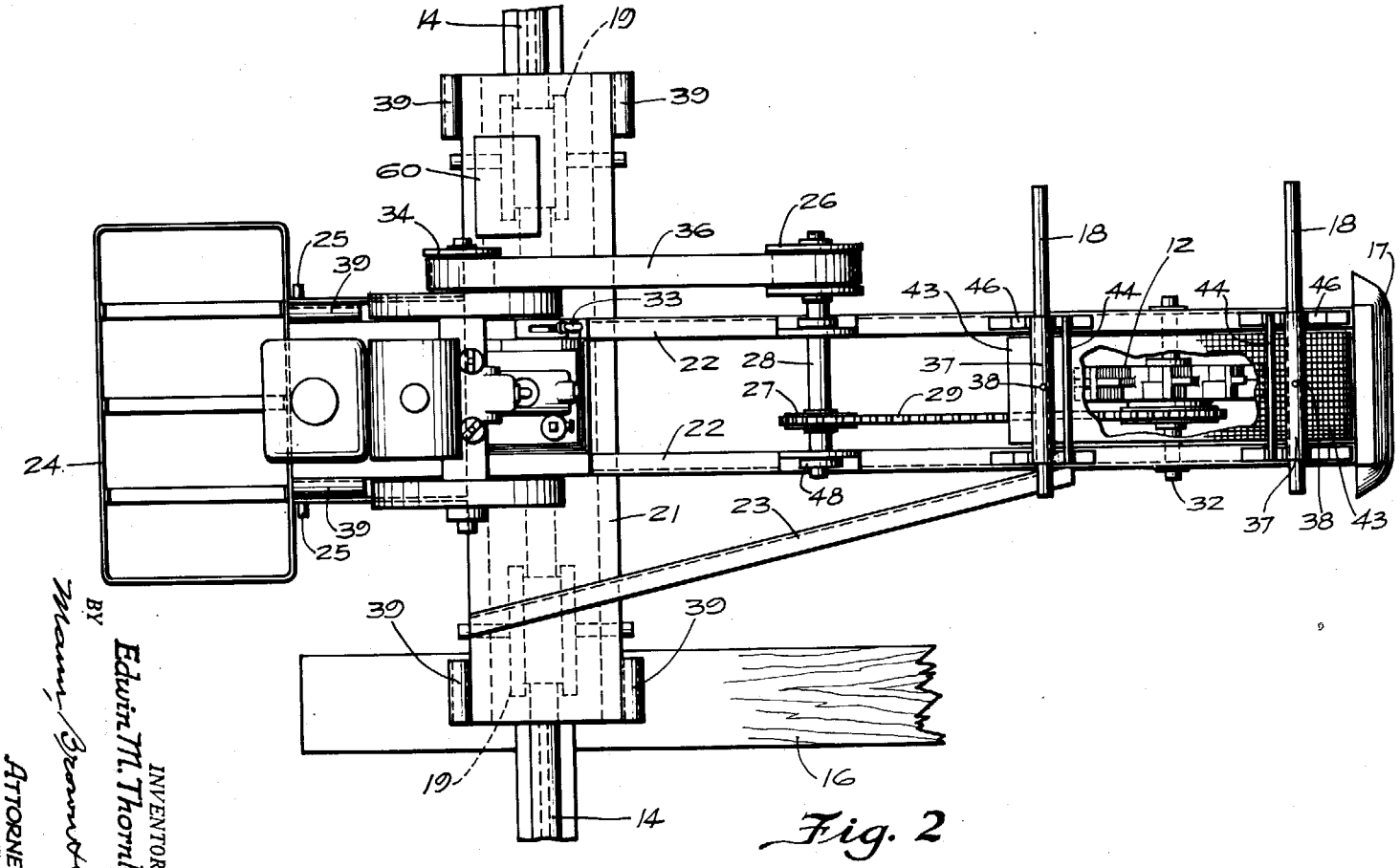

Additional objects and advantages will be apparent from the following description and from the drawings, in which Fig. 1 is a perspective view of the apparatus chosen for illustration of the invention; and Fig. 2 is a plan view thereof, both views being drawn approximately to scale, but being perhaps somewhat diagrammatic as to details.

A preferred form of the invention has been chosen for illustration and description, in compliance with section 4888 of the Revised Statutes, but persons skilled in the art will readily perceive other means for accomplishing the same results, and the claims are, therefore, to be construed as broadly as possible, consistent with the prior art.

It is believed that the general nature of the invention will be most readily apparent from Fig. 1 from which it is seen that a motor 11 drives a digging wheel 12, both of which are carried by carriage 13 which is movable along rail 14 and can be rocked thereon to lower the digging wheel 12 into the ballast adjacent a tie 16 to dig the ballast therefrom at the vicinity of the position in which another rail of the track is to be laid. The digging wheel 12 is centered about 61 inches from a point on or above the center-line of rail 14. The digging wheel 12 throws the ballast against a shield 17 from which the ballast drops into a pile just far enough away from the digging wheel 12 so that it will not roll back into the hole that is dug.

Carriage 13 is provided with handles 18 by which the carriage may be rocked and moved along the rail 14 for ease in rocking the carriage and so that the operator will be in a position to see exactly what the digging wheel 12 is doing the handles 18 are approximately in the position shown. In order that force applied to the handles 18 longitudinally of the rail 14 to move the carriage along the rail will move the carriage smoothly in spite of being applied at a substantial distance from the rail, the wheels are preferably spaced a substantial distance apart being carried by an underframe 21 on which the main frame 22 of the carriage is mounted. A spacing of the wheels of 45 inches has been found satisfactory. A brace 23 makes the structure more rigid than would otherwise be the case. The wheels 19 are flanged on both sides of the rail, 1 inch flanges having been found satisfactory.

It is desirable to have the carriage 13 so unbalanced that the digging wheel 12 will tend to rise. To this end, the engine 11 is mounted with its center of gravity to the rear of rail 14, that is, farther from wheel 12 than the distance from wheel 12 to a plane through wheels 19 and perpendicular to frame 22. A basket 24 is removably secured to the carriage 13 and adapted to carry scrap metal or other balancing weights to compensate for any inaccuracy in the positioning of motor 11 or variation in the weight of fuel carried. It may be found that the basket 24 may be omitted as well as not if the motor is more carefully positioned and the fuel tanks centered. Conveniently the basket 24 may be supported by extensions resting on tubing 25 welded to frame 22, and extending slightly under truck 21. The motor 11 drives a pulley 26 which in turn drives a sprocket wheel 27, both the pulley 26 and the sprocket wheel 27 being fast on shaft 28 which is suitably journalled to the carriage 13. The sprocket wheel 27 drives chain 29 which drives sprocket wheel 31 which in turn drives digging wheel 12, both being fast on shaft 32 which is journalled on carriage 13. The motor 11 is of course provided with a suitable throttle and spark control means and with either a clutch or a belt tightening lever 33. In the illustrated form, the lever 33 slides the engine 11 rearwardly on its mounting to tighten the engine pulley 34 against the belt to start the driving of the digging wheel 12.

It is desirable for the operator to face in the direction in which the machine is to be moved and yet it is desirable not to have handles projecting where they are not being used. Accordingly, the handles 18 are slidable within tubes 37 so that they may project on either side of the machine, being retained in the desired position by pins 38. In like manner, it will be noted that tubes 39 are provided on the underframe or truck 21 and at the rear end of frame 22 into which handles may be inserted for lifting the apparatus from the rail. It is important to be able to remove the entire apparatus easily from the track for the passage of trains.

The lower part 41 of the guard 17 is preferably flexible (desirably rubber) so that obstructions will not prevent pressing the digging wheel 12 sufficiently deeply into the ballast to remove the ballast along a sufficient length of the tie 16 to get it entirely clear in the vicinity of the adzing. However, the digging wheel 12 is of large enough diameter so that it does not have to be pressed excessively deeply or steeply into the ballast in order to clear a sufficient length of the tie adjacent the top thereof. A wheel 24 inches in diameter including 2½ inch lugs has been found satisfactory to prepare for an adzing machine having a 13 inch head. For a 17 inch cutting head the lugs or teeth are desirably 4 inches long and the wheel 27 inches in outside diameter. One consideration that seems important is that the teeth be approximately as long as the depth of digging at least along their sides, so the wheel may be moved laterally after being moved down. As to the size of the wheel it seems at present to be important to clear a long enough hole by the time the wheel has buried ¾ of its circumference, when the teeth on one side would be moving downwardly at about a 45° angle. A width of 4 inches has also been found satisfactory for wheel 12, although the width is probably not important since the digging wheel is pressed down adjacent one tie to the desired depth and then the carriage pushed along the rail until the digging wheel comes to the next tie, thus cleaning out a zone extending from one tie to the next.

An additional shield 43 is provided above the digging wheel as clearly illustrated in Fig. 1. This may generally be made of ⅛ inch or thinner sheet iron welded to rods 44 which in turn are welded to braces 46.

The various journal boxes 48 may be of any desired form, having either journal type or anti-friction bearings. Preferably each of these is provided with suitable oil supply means and if this comprises a tube such as the tube 49, it is preferred that a protective bar 51 be provided as shown to protect the oil tube from damage.

Although a wide variety of digging wheels and tooth shapes can be used, the illustrated form has been found to be very satisfactory. As the teeth wear down, they can be renewed by welding. The heavy braced tooth construction illustrated is preferred to a simple unbraced construction for durability particularly in resisting deformation when a rock is struck which is relatively firmly positioned. As illustrated, the teeth comprise two legs which may be further braced by flanges 54.

A speed of about 700 R. P. M. has been found to be satisfactory for digging wheel 12.

It is believed that details of construction not described are sufficiently clear from the drawings alone. Box 60 is for a battery for engine 11.

From the foregoing, it is seen that a simple machine is provided which is highly satisfactory for removing ballast from adjacent a tie to be adzed, a machine which can easily be operated by one man. The machine enables one man followed by a man with a broom to perform very quickly and easily the ballast operation which has heretofore been very tedious and slow. In a given length of time the two men and the machine can do a better job than 12 to 15 men manually.

I claim:

1. Apparatus for removing ballast from adjacent a tie along the portion thereof to be adzed comprising a carriage, wheels supporting the carriage and adapted to run on a rail, a prime mover carried by the carriage, a digging wheel driven by the prime mover and carried by the carriage at a position spaced from said wheels at approximately the proper spacing for the rails of a track and projecting downwardly from the carriage so that it may be pressed into the ballast adjacent the tie by rocking the carriage on the rail, and a guard aligned with said wheel in the direction toward which it will throw the ballast and disposed to drop the ballast thrown from the wheel approximately at the ends of the ties, said wheel having projections thereon adapted to engage the ballast and throw it to the guard.

2. Apparatus for removing ballast from adjacent a tie along the portion thereof to be adzed comprising a carriage, wheels supporting the carriage and adapted to run on a rail, a prime mover carried by the carriage, a digging wheel driven by the prime mover and carried by the carriage at a position spaced from the line of said wheels and projecting downwardly from the carriage so that it may be pressed into the ballast adjacent the tie by rocking the carriage on the rail, and a guard aligned with said wheel in the direction toward which it will throw the ballast but a sufficient distance from the digging wheel so that the ballast thrown by the wheel will drop in a desired position and not roll back into the hole dug by the wheel, said wheel having projections thereon adapted to engage the ballast and throw it to the guard.

3. Apparatus for removing ballast from adjacent a tie along the portion thereof to be adzed comprising a carriage, wheels supporting the carriage and adapted to run on a rail, a prime mover carried by the carriage, a digging wheel driven by the prime mover and carried by the carriage at a position spaced from said wheels at approximately the proper spacing for the rails of a track and projecting downwardly from the carriage so that it may be pressed into the ballast adjacent the tie by rocking the carriage on the rail, and a guard aligned with said wheel in the direction toward which it will throw the ballast but a sufficient distance from the digging heel so that the ballast thrown by the wheel will drop in a desired position and not roll back into the hole dug by the wheel, said wheel having projections thereon adapted to engage the ballast and throw it to the guard and being of a sufficient diameter so that with approximately three-fourths of the circumference above the ballast, it will clean the ballast from a sufficient length of the tie adjacent the top thereof for the adzing operation.

4. Apparatus for removing ballast from adjacent a tie along the portion thereof to be adzed comprising a carriage, wheels supporting the carriage and adapted to run on a rail, a prime mover carried by the carriage, a digging wheel driven by the prime mover and carried by the carriage at a position spaced from the line of said wheels and projecting downwardly from the carriage so that it may be pressed into the ballast adjacent the tie by rocking the carriage on the rail, and a guard aligned with said wheel in the direction toward which it will throw the ballast but a sufficient distance from the digging wheel so that the ballast thrown by the wheel will drop in a desired position and not roll back into the hole dug by the wheel, said wheel having projections thereon adapted to engage the ballast and throw it to the guard; said carriage being so unbalanced that it normally rocks in a direction to raise the digging wheel.

5. Apparatus for removing ballast from adjacent a tie along the portion thereof to be adzed comprising a carriage, wheels supporting the carriage and adapted to run on a rail, a prime mover carried by the carriage, a digging wheel driven by the prime mover and carried by the carriage at a position spaced from said wheels at approximately the proper spacing for the rails of a track and projecting downwardly from the carriage so that it may be pressed into the ballast adjacent the tie by rocking the carriage on the rail, a guard aligned with said wheel in the direction toward which it will throw the ballast but a sufficient distance from the digging heel so that the ballast thrown by the wheel will drop in a desired position and not roll back into the hole dug by the wheel, said wheel having projections thereon adapted to engage the ballast and throw it to the guard, and means for counterbalancing the carriage to normally rock it toward a position in which the digging wheel is raised.

6. Apparatus for removing ballast from adjacent a tie along the portion thereof to be adzed comprising a carriage, wheels supporting the carriage and adapted to run on a rail, a prime mover carried by the carriage, a digging wheel driven by the prime mover and carried by the carriage at a position spaced from the line of said wheels and projecting downwardly from the carriage so that it may be pressed into the ballast adjacent the tie by rocking the carriage on the rail, a guard aligned with said wheel in the direction toward which it will throw the ballast but a sufficient distance from the digging heel so that the ballast thrown by the wheel will drop in a desired position and not roll back into the hole dug by the wheel, said wheel having projections thereon adapted to engage the ballast and throw it to the guard, and handle means adjacent the digging wheel including a hollow member mounted on the carriage and a bar insertable in said member to project in either direction transversely of the carriage and longitudinally of the rail so that the operator may stand on either side of the carriage depending on which way he desires to move the carriage.

7. Apparatus for removing ballast from adjacent a tie along the portion thereof to be adzed comprising a carriage, wheels supporting the carriage and adapted to run on a rail, a prime mover carried by the carriage, a digging wheel driven by the prime mover and carried by the carriage at a position spaced from the line of said wheels and projecting downwardly from the carriage so that it may be pressed into the ballast adjacent the tie by rocking the carriage on the rail, a guard aligned with said wheel in the direction toward which it will throw the ballast but a sufficient distance from the digging heel so that the ballast thrown by the wheel will drop in a desired position and not roll back into the hole dug by the wheel, said wheel having projections thereon adapted to engage the ballast and throw it to the guard, and handle means adjacent the digging wheels; said running wheels being flanged on both sides of the rail and being widely spaced along the rail whereby movement of the carriage by force applied adjacent to the digging wheel will move the carriage smoothly along the rail.

8. Apparatus for digging ballast comprising a rockable carriage, *means supporting the carriage for movement along a railroad trackway in a direction transverse of the ties*, a prime mover carried by the carriage, and digging means driven by the prime mover including a wheel carried by the carriage and rotatable about an axis generally horizontal *and perpendicular to the planes of the sides of the ties*, and spaced, sturdy, rock-digging teeth [with complete clearance therebetween] moving around the axis of the wheel and [supported by] *receiving support from* said wheel, having faces, of substantial *area* [extent radially beyond any tooth connecting means], facing *generally forwardly* in the direction of their motion *around the axis of the wheel, having complete clearance between the teeth upwardly from the path of their tips a substantial extent* and following a path of movement *in a plane parallel to the sides of the ties* adapted to extend into and out from the ballast bed between the ties of a railroad track, said digging means being so constructed and rockable with the carriage as to be adapted while in operating condition *with the machine running* to move down into ballast in the space between ties, clean the ballast from adjacent one tie, and then by movement of the carriage transversely of the ties move through the ballast, digging the ballast away as the movement continues, to another position adjacent the next tie, and clean the ballast from adjacent the next tie; said teeth being exposed for digging from each side *with the exposed and generally forwardly facing portions of the sides extending outwardly* far enough [beyond any portion of the wheel therebetween] to enable the [wheel] *digging means* to dig its way [axially] through ballast in either direction *transversely of the ties, and the digging portions of the teeth lying within a zone approximately four inches in width.*

9. Apparatus for digging ballast comprising a rockable carriage, *means supporting the carriage for movement along a railroad trackway in a direction transverse of the ties*, a prime mover carried by the carriage, and digging means driven by the prime mover including a wheel carried by the carriage and rotatable about an axis generally horizontal *and perpendicular to the planes of the sides of the ties*, and spaced, sturdy, rock-digging teeth moving around the axis of the wheel and [supported by] *receiving support from* said wheel, having faces, of substantial *area* [extent radially beyond any tooth connecting means], facing *generally forwardly* in the direction of their motion *around the axis of the wheel* and following a path of movement *in a plane parallel to the sides of the ties* adapted to extend into and out from the ballast bed between the ties of a railroad track, said digging means being so constructed and rockable with the carriage as to be adapted while in operating condition *with the digging means driven by the prime mover* to move down into ballast in the space between ties, clean the ballast from adjacent one tie, and then by movement of the carriage transversely of the ties move through the ballast, digging the ballast away as the movement continues, to another position adjacent the next tie, and clean the ballast from adjacent the next tie; said teeth, *within a zone of a width substantially less than the ordinary space between ties,* each having a forwardly directed digging face exposed all along the bottom thereof and upwardly along each side at least two inches to enable the [wheel] *digging means* to dig its way [axially] through ballast in either direction *transversely of the ties.*

10. Apparatus for digging ballast comprising a rockable carriage, *running* wheels supporting the carriage and adapted to run on a rail, a prime mover carried by the carriage, and digging means driven by the prime mover including a wheel carried by the carriage and rotatable about an axis generally horizontal and parallel to the rail line, and spaced, sturdy, rock-digging teeth moving around the axis of the wheel and [supported by] *receiving support from* said wheel, having faces, of substantial *area* [extent radially beyond any tooth connecting means], facing *generally forwardly* in the direction of their motion *around the axis of the wheel* and following a path of movement *in a plane parallel to the sides of the ties* adapted to extend into and out from the ballast bed between the ties of a railroad track, said digging means being so constructed and rockable with the carriage as to be adapted while in operating condition *with the digging means driven by the prime mover* to move down into ballast in the space between ties, clean the ballast from adjacent one tie, and then by movement of the carriage transversely of the ties move through the ballast, digging the ballast away as the movement continues, to another position adjacent the next tie, and clean the ballast from adjacent the next tie; said teeth each having a forwardly directed digging face exposed all along the bottom thereof and upwardly along each side at least two inches to enable the [wheel] *digging means* to dig its way [axially] through ballast in either direction *transversely of the ties,* each tooth being as wide adjacent the bottom as the maximum width of the tooth at any point not over two inches thereabove, *but the teeth at their bottoms spanning a width substantially less than the ordinary space between ties,* and said carriage being suitably balanced and carrying suitable handles for being pushed along the track and rocked *to lower the digging means beside each tie* by one man *positioned approximately at the side of the digging means and remote from the rocking axis.*

*11. Apparatus for digging ballast comprising a rockable carriage, means supporting the carriage for movement along a railroad trackway in a direction transverse of the ties, a prime mover carried by the carriage, and digging means driven by the prime mover including a wheel carried by the carriage and rotatable about an axis generally horizontal and perpendicular to the planes of the sides of the ties, and spaced, sturdy, rock-digging teeth moving around the axis of the wheel and receiving support from said wheel, having faces, of substantial area, facing generally forwardly in the direction of their motion around the axis of the wheel, having complete clearance between the teeth upwardly from the path of their tips a substantial extent and following a path of movement in a plane parallel to the sides of the ties adapted to extend into and out from the ballast bed between the ties of a railroad track, said digging means being so constructed and rockable with the carriage as to be adapted while in operating condition with the machine running to move down into ballast in the space between ties, clean the ballast from adjacent one tie, and then by movement of the carriage transversely of the ties move through the ballast, digging the ballast away as the movement continues, to another position adjacent the next tie, and clean the ballast from adjacent the next tie; said teeth being exposed for digging from each side with the exposed and generally forwardly facing portions of the sides extending outwardly far enough to enable the digging means to dig its way through ballast in either direction transversely of the ties and the teeth collectively having a span across their bottoms as great as at any point within two inches thereabove but substantially less than the ordinary spacing between ties, and said carriage carrying suitable handle means remote from the running wheels and beside the carriage inwardly of its end remote from the running wheels for being pushed along the track by one man and being suitably balanced to be quickly rocked to lower the digging means in the successive spaces between ties.*

*12. Apparatus for digging ballast comprising a rockable carriage, means supporting the carriage for movement along a railroad trackway in a direction transverse of the ties, a prime mover carried by the carriage, and digging means driven by the prime mover including a wheel carried by the carriage and rotatable about an axis generally horizontal and perpendicular to the planes of the sides of the ties, and spaced, sturdy, rock-digging teeth moving around the axis of the wheel and receiving support from said wheel, having faces of substantial area, facing generally forwardly in the direction of their motion around the axis of the wheel, having complete clearance between the teeth upwardly from the path of their tips a substantial extent and following a path of movement in a plane parallel to the sides of the ties adapted to extend into and out from the ballast bed between the ties of a railroad track, said digging means being so constructed and rockable with the carriage as to be adapted while in operating condition with the machine running to move down into ballast in the space between ties, clean the ballast from adjacent one tie, and then by movement of the carriage transversely of the ties move through the ballast, digging the ballast away as the movement continues, to another position adjacent the next tie, and clean the ballast from adjacent the next tie; said teeth being exposed for digging from each side with the exposed and generally forwardly facing portions of the sides extending outwardly far enough to enable the digging means to dig its way through ballast in either direction transversely of the ties and the teeth collectively having a span across their bottoms as great as at any point within two inches thereabove but substantially less than the ordinary spacing between ties, and said car-*

*riage carrying suitable handle means remote from the running wheels and beside the carriage inwardly of its end remote from the running wheels for being pushed along the track by one man and being suitably balanced to be quickly rocked to lower the digging means in the successive spaces between ties, and a guard aligned with said wheel in the direction toward which the digging means will throw the ballast and disposed to drop the ballast thrown from the digging means approximately at the ends of the ties.*

*13. Apparatus for digging ballast comprising a rockable carriage, means supporting the carriage for movement along a railroad trackway in a direction transverse of the ties, a prime mover carried by the carriage, and digging means driven by the prime mover including a wheel carried by the carriage and rotatable about an axis generally horizontal and perpendicular to the planes of the sides of the ties, and spaced, sturdy, rock-digging teeth moving around the axis of the wheel and receiving support from said wheel, having faces, of substantial area, facing generally forwardly in the direction of their motion around the axis of the wheel, having complete clearance between the teeth upwardly from the path of their tips a substantial extent and following a path of movement in a plane parallel to the sides of the ties adapted to extend into and out from the ballast bed between the ties of a railroad track, said digging means being so constructed and rockable with the carriage as to be adapted while in operating condition with the machine running to move down into ballast in the space between ties, clean the ballast from adjacent one tie, and then by movement of the carriage transversely of the ties move through the ballast, digging the ballast away as the movement continues, to another position adjacent the next tie, and clean the ballast from adjacent the next tie; said teeth being exposed for digging from each side with the exposed and generally forwardly facing portions of the sides extending outwardly far enough to enable the digging means to dig its way through ballast in either direction transversely of the ties and the teeth collectively having a span across their bottoms as great as at any point within two inches thereabove but substantially less than the ordinary spacing between ties, and said carriage carrying suitable handle means remote from the running wheels and beside the carriage inwardly of its end remote from the running wheels for being pushed along the track by one man and being suitably balanced to be quickly rocked to lower the digging means in the successive spaces between ties, and a guard aligned with said wheel in the direction toward which the digging means will throw the ballast but a sufficient distance from the running wheels so that the ballast thrown by the digging means will drop in a desired position and not roll back adjacent the portion of the tie to be adzed.*

*14. Apparatus for digging ballast comprising a rockable carriage, means supporting the carriage for movement along a railroad trackway in a direction transverse of the ties, a prime mover carried by the carriage, and digging means driven by the prime mover including a wheel carried by the carriage and rotatable about an axis generally horizontal and perpendicular to the planes of the sides of the ties, and spaced, sturdy, rock-digging teeth moving around the axis of the wheel and receiving support from said wheel, having faces, of substantial area, facing generally forwardly in the direction of their motion around the axis of the wheel, having complete clearance between the teeth upwardly from the path of their tips a substantial extent and following a path of movement in a plane parallel to the sides of the ties adapted to extend into and out from the ballast bed between the ties of a railroad track, said digging means being so constructed and rockable with the carriage as to be adapted while in operating condition with the machine running to move down into ballast in the space between ties, clean the ballast from adjacent one tie, and then by movement of the carriage transversely of the ties move through the ballast, digging the ballast away as the movement continues, to another position adjacent the next tie, and clean the ballast from adjacent the next tie; said teeth being exposed for digging from each side with the exposed and generally forwardly facing portions of the sides extending outwardly far enough to enable the digging means to dig its way through ballast in either direction transversely of the ties and the teeth collectively having a span across their bottoms as great as at any point within two inches thereabove but substantially less than the ordinary spacing between ties, and said carriage carrying suitable handle means remote from the running wheels and beside the carriage inwardly of its end remote from the running wheels for being pushed along the track by one man and being suitably balanced to be quickly rocked to lower the digging means in the successive spaces between ties, and a guard aligned with said wheel in the direction toward which the digging means will throw the ballast but a sufficient distance from the running wheels so that the ballast thrown by the digging means will drop in a desired position and not roll back adjacent the portion of the tie to be adzed; said carriage being so unbalanced that it normally rocks in a direction to raise the digging means.*

*15. Apparatus for digging ballast comprising a rockable carriage, means supporting the carriage for movement along a railroad trackway in a direction transverse of the ties, a prime mover carried by the carriage, and digging means driven by the prime mover including a wheel carried by the carriage and rotatable about an axis generally horizontal and perpendicular to the planes of the sides of the ties, and spaced, sturdy, rock-digging teeth moving around the axis of the wheel and receiving support from said wheel, having faces, of substantial area, facing generally forwardly in the direction of their motion around the axis of the wheel, having complete clearance between the teeth upwardly from the path of their tips a substantial extent and following a path of movement in a plane parallel to the sides of the ties adapted to extend into and out from the ballast bed between the ties of a railroad track, said digging means being so constructed and rockable with the carriage as to be adapted while in operating condition with the machine running to move down into ballast in the space between ties, clean the ballast from adjacent one tie, and then by movement of the carriage transversely of the ties move through the ballast, digging the ballast away as the movement continues, to another position adjacent the next tie, and clean the ballast from adjacent the next tie; said teeth being exposed for digging from each side with the exposed and generally forwardly facing portions of the sides extending outwardly far enough to enable the digging means to dig its way through ballast in either direction transversely of the ties and the teeth collectively*

*having a span across their bottoms as great as at any point within two inches thereabove but substantially less than the ordinary spacing between ties, and said carriage carrying suitable handle means remote from the running wheels and beside the carriage inwardly of its end remote from the running wheels for being pushed along the track by one man and being suitably balanced to be quickly rocked to lower the digging means in the successive spaces between ties, and a guard aligned with said wheel in the direction toward which the digging means will throw the ballast but a sufficient distance from the running wheels so that the ballast thrown by the digging means will drop in a desired position and not roll back adjacent the portion of the tie to be adzed, said digging means being carried by the carriage at a position spaced from said running wheels at approximately the proper spacing for the rails of a track.*

*16. Apparatus for digging ballast comprising a rockable carriage, means supporting the carriage for movement along a railroad trackway in a direction transverse of the ties, a prime mover carried by the carriage, and digging means driven by the prime mover including a wheel carried by the carriage and rotatable about an axis generally horizontal and perpendicular to the planes of the sides of the ties, and spaced, sturdy, rock-digging teeth moving around the axis of the wheel and receiving support from said wheel, having faces, of substantial area, facing generally forwardly in the direction of their motion around the axis of the wheel, having complete clearance between the teeth upwardly from the path of their tips a substantial extent and following a path of movement in a plane parallel to the sides of the ties adapted to extend into and out from the ballast bed between the ties of a railroad track, said digging means being so constructed and rockable with the carriage as to be adapted while in operating condition with the machine running to move down into ballast in the space between ties, clean the ballast from adjacent one tie, and then by movement of the carriage transversely of the ties move through the ballast, digging the ballast away as the movement continues, to another position adjacent the next tie, and clean the ballast from adjacent the next tie; said teeth being exposed for digging from each side with the exposed and generally forwardly facing portions of the sides extending outwardly far enough to enable the digging means to dig its way through ballast in either direction transversely of the ties and the teeth collectively having a span across their bottoms as great as at any point within two inches thereabove but substantially less than the ordinary spacing between ties, and said carriage carrying suitable handle means remote from the running wheels and beside the carriage inwardly of its end remote from the running wheels for being pushed along the track by one man and being suitably balanced to be quickly rocked to lower the digging means in the successive spaces between ties, and a guard aligned with said wheel in the direction toward which the digging means will throw the ballast but a sufficient distance from the running wheels so that the ballast thrown by the digging means will drop in a desired position and not roll back adjacent the portion of the tie to be adzed, said handles each including a hollow member mounted on the carriage and a bar insertable in said member to project in either direction transversely of the carriage and longitudinally of the rail so that the operator may stand on either side of the carriage depending on which way he desires to move the carriage.*

*17. Apparatus for digging ballast comprising a rockable carriage, means supporting the carriage for movement along a railroad trackway in a direction transverse of the ties, a prime mover carried by the carriage, and digging means driven by the prime mover including a wheel carried by the carriage and rotatable about an axis generally horizontal and perpendicular to the planes of the sides of the ties, and spaced, sturdy, rock-digging teeth moving around the axis of the wheel and receiving support from said wheel, having faces, of substantial area, facing generally forwardly in the direction of their motion around the axis of the wheel, having complete clearance between the teeth upwardly from the path of their tips a substantial extent and following a path of movement in a plane parallel to the sides of the ties adapted to extend into and out from the ballast bed between the ties of a railroad track, said digging means being so constructed and rockable with the carriage as to be adapted while in operating condition with the machine running to move down into ballast in the space between ties, clean the ballast from adjacent one tie, and then by movement of the carriage transversely of the ties move through the ballast, digging the ballast away as the movement continues, to another position adjacent the next tie, and clean the ballast from adjacent the next tie; said teeth being exposed for digging from each side with the exposed and generally forwardly facing portions of the sides extending outwardly far enough to enable the digging means to dig its way through ballast in either direction transversely of the ties and the teeth collectively having a span across their bottoms as great as at any point within two inches thereabove but substantially less than the ordinary spacing between ties, and said carriage carrying suitable handle means remote from the running wheels and beside the carriage inwardly of its end remote from the running wheels for being pushed along the track by one man and being suitably balanced to be quickly rocked to lower the digging means in the successive spaces between ties, and a guard aligned with said wheel in the direction toward which the digging means will throw the ballast but a sufficient distance from the running wheels so that the ballast thrown by the digging means will drop in a desired position and not roll back adjacent the portion of the tie to be adzed, said running wheels being flanged on both sides of the rail and being widely spaced along the rail whereby movement of the carriage by force applied adjacent to the digging means will move the carriage smoothly along the rail.*

*18. Apparatus for digging ballast comprising a rockable carriage, means supporting the carriage for movement along a railroad trackway in a direction transverse of the ties, a prime mover carried by the carriage, and digging means driven by the prime mover including a wheel carried by the carriage and rotatable about an axis generally horizontal and perpendicular to the planes of the sides of the ties, and spaced, sturdy, rock-digging teeth moving around the axis of the wheel and receiving support from said wheel, having faces, of substantial area, facing generally forwardly in the direction of their motion around the axis of the wheel, having complete clearance between the teeth upwardly*

*from the path of their tips a substantial extent and following a path of movement in a plane parallel to the sides of the ties adapted to extend into and out from the ballast bed between the ties of a railroad track, said digging means being so constructed and rockable with the carriage as to be adapted while in operating condition with the machine running to move down into ballast in the space between ties, clean the ballast from adjacent one tie to form a shallow depression in the ballast at least 17 inches along a tie, and then by movement of the carriage transversely of the ties move through the ballst, digging the ballast away as the movement continues, to another position adjacent the next tie, and clean the ballast from adjacent the next tie; said teeth being exposed for digging from each side with the exposed and generally forwardly facing portions of the sides extending outwardly far enough to enable the digging means to dig its way through ballast in either direction transversely of the ties, and the digging portions of the teeth lying within a zone substantially less than the ordinary spacing between ties, and stop means aligned with the digging means in the direction in which ballast is predominantly thrown thereby to drop the thrown ballast in a desired position.*

*19. Apparatus for digging ballast comprising a rockable carriage, means supporting the carriage for movement along a railroad trackway in a direction transverse of the ties, a prime mover carried by the carriage, and digging means driven by the prime mover including a wheel carried by the carriage and rotatable about an axis generally horizontal and perpendicular to the planes of the sides of the ties, and spaced, sturdy, rock-digging teeth moving around the axis of the wheel and receiving support from said wheel, having faces, of substantial area, facing generally forwardly in the direction of their motion around the axis of the wheel, having complete clearance between the teeth upwardly from the path of their tips a substantial extent and following a path of movement in a plane parallel to the sides of the ties adapted to extend into and out from the ballast bed between the ties of a railroad track, said digging means being so constructed and rockable with the carriage as to be adapted while in operating condition with the machine running to move down into ballast in the space between ties, clean the ballast from adjacent one tie to form a shallow depression in the ballast at least 17 inches along a tie, and then by movement of the carriage transversely of the ties move through the ballast, digging the ballast away as the movement continues, to another position adjacent the next tie, and clean the ballast from adjacent the next tie; said teeth being exposed for digging from each side with the exposed and generally forwardly facing portions of the sides extending outwardly far enough to enable the digging means to dig its way through ballast in either direction transversely of the ties, and the digging portions of the teeth lying within a zone substantially less than the ordinary spacing between ties, and stop means aligned with the digging means in the direction in which ballast is predominantly thrown thereby to drop the thrown ballast in a desired position, said stop means being carried by the rockable carriage and being yieldable along its lower portion to permit the digging wheel to press into the ballast.*

EDWIN M. THORNLEY.

References Cited in the file of this patent

UNITED STATES PATENTS

| Number | Name | Date |
|---|---|---|
| 306,755 | Howard | Oct. 21, 1884 |
| 720,841 | Pawel | Feb. 17, 1903 |
| 892,056 | Jackson | June 30, 1908 |
| 954,863 | Henderson | Apr. 12, 1910 |
| 1,120,179 | Blevins | Dec. 8, 1914 |
| 1,252,564 | Geisler | Jan. 8, 1918 |
| 1,300,064 | Warren | Apr. 8, 1919 |
| 1,427,516 | Carmen | Aug. 29, 1922 |
| 1,476,375 | Shook | Dec. 4, 1923 |
| 1,538,565 | Loken | May 19, 1925 |
| 1,762,441 | Johnson | June 10, 1930 |
| 1,820,636 | Talboys | Aug. 25, 1931 |
| 2,207,854 | Foreman et al. | July 16, 1940 |
| 2,254,742 | Humphrey | Sept. 2, 1941 |
| 2,336,652 | Talboys | Dec. 14, 1943 |
| 2,463,499 | Thornley | Mar. 1, 1949 |

FOREIGN PATENTS

| Number | Country | Date |
|---|---|---|
| 15,839 | Great Britain | Dec. 24, 1885 |